United States Patent [19]

Shfaram et al.

[11] Patent Number: 5,200,132
[45] Date of Patent: Apr. 6, 1993

[54] METHOD AND AN APPARATUS FOR PRODUCING A DRIP-IRRIGATION EMITTER

[75] Inventors: Adiel Shfaram, Hof Ashkelon; Avraham Zakay, Rishon LeZion, both of Israel

[73] Assignee: Plastro Gvat, Kibbutz Gvat, Israel

[21] Appl. No.: 742,484

[22] Filed: Aug. 5, 1991

Related U.S. Application Data

[63] Continuation of Ser. No. 423,584, Oct. 17, 1989, abandoned, which is a continuation of Ser. No. 172,257, Mar. 23, 1988, abandoned.

[30] Foreign Application Priority Data

Mar. 31, 1987 [IL] Israel ......................... 82072

[51] Int. Cl.[5] ..................... B29C 45/16; B29C 65/56
[52] U.S. Cl. .............................. 264/238; 29/450;
   29/525; 264/250; 264/328.8; 264/334; 425/438;
   425/556; 425/577
[58] Field of Search ............ 264/238, 242, 250, 297.2,
   264/328.1, 328.11, 328.8, 334; 29/450, 451, 525;
   425/438, 556, 577

[56] References Cited

U.S. PATENT DOCUMENTS

3,013,308 12/1961 Armour ........................... 264/238
3,685,933 8/1972 Schneider ....................... 425/577
4,281,798 8/1981 Lemeistrich .

FOREIGN PATENT DOCUMENTS

37128 12/1979 Australia .
37304 9/1981 Australia .
005381 11/1979 European Pat. Off. .
0138636 4/1985 European Pat. Off. .
2435287 4/1980 France .
57-135133 8/1982 Japan ................................. 264/238
753410 7/1956 United Kingdom .

Primary Examiner—Jill L. Heitbrink
Attorney, Agent, or Firm—Sandler, Greenblum & Bernstein

[57] ABSTRACT

A method for manufacturing a drip irrigation emitter, including the steps of molding onto an injection-mold core having at least n different active diameters, n different, axially spaced apart members of the emitter, at least n−1 of the members being substantially annular, the inside diameter of at least one of the annular members being a tight fit on the outside diameter of the next smaller of the members, stripping the members off the core, starting from the member having the largest inside diameter, thereby causing the members to be tightly nested one inside the other, in a predetermined axial and angular relationship, and ejecting the thus fully assembled emitter from the mold. There is also provided an injection mold for producing fully assembled multi-part drip-irrigation emitters.

3 Claims, 5 Drawing Sheets

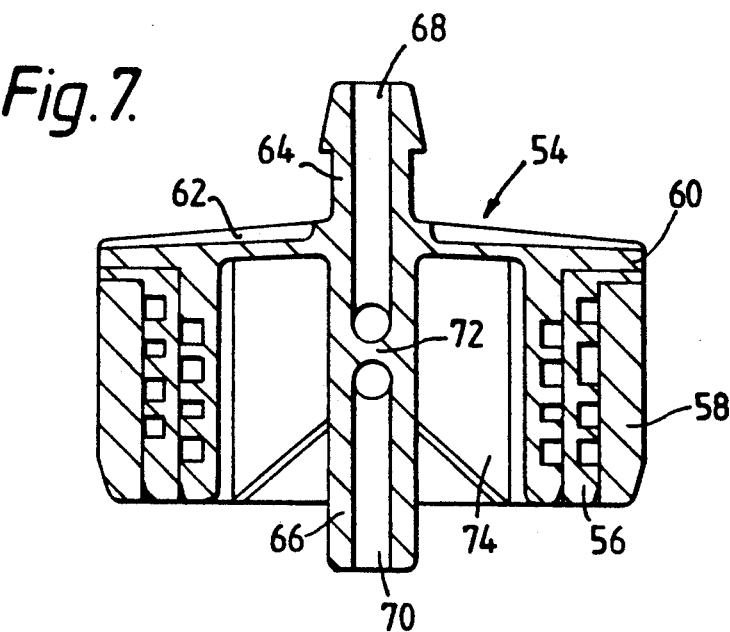
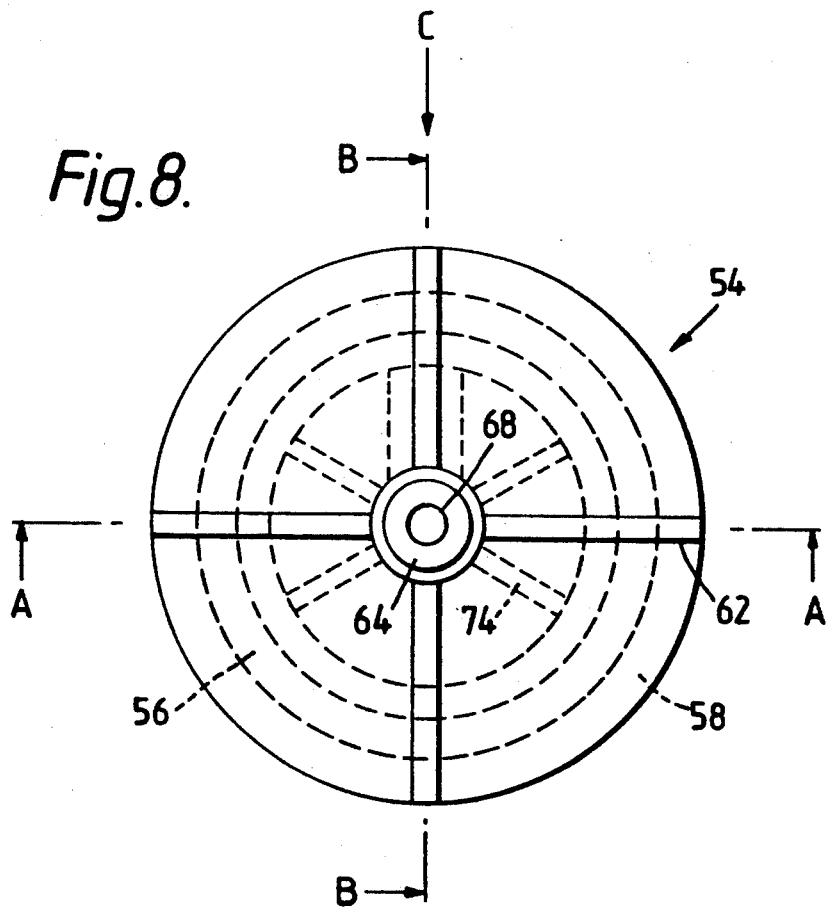

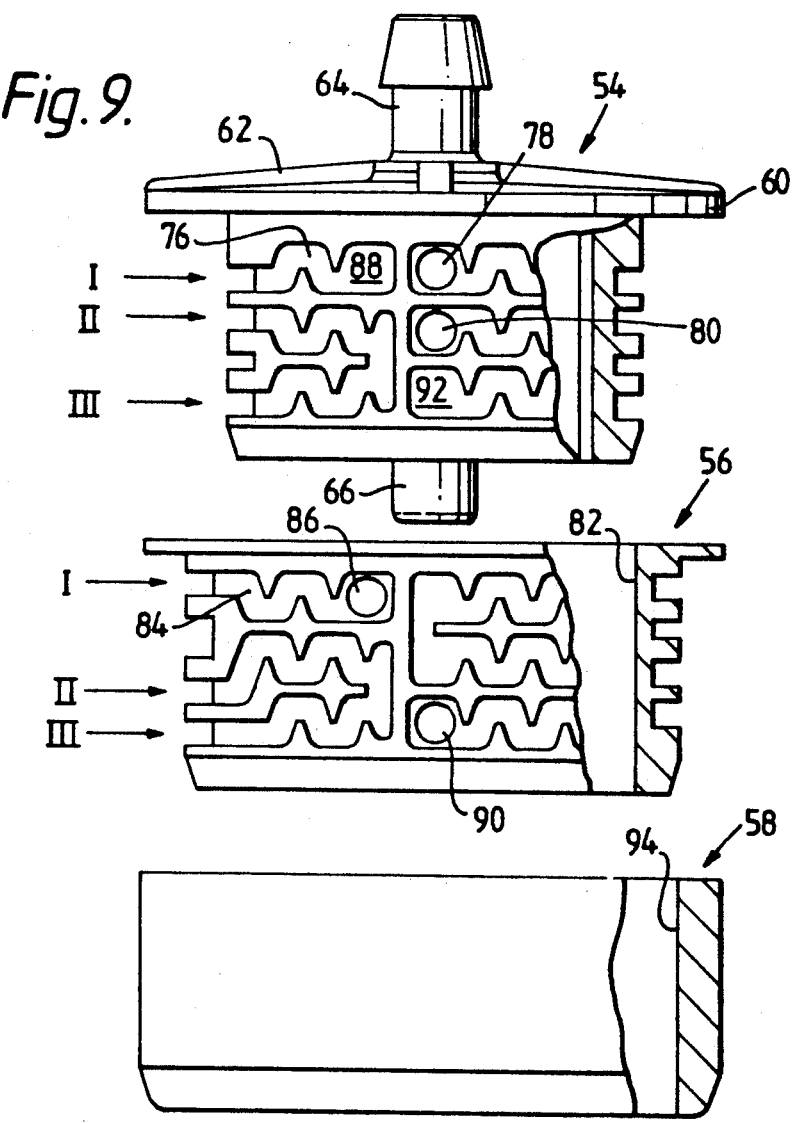
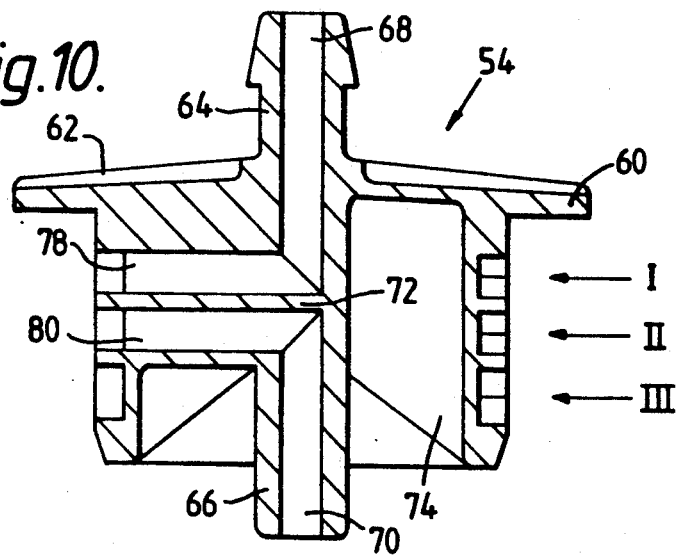

METHOD AND AN APPARATUS FOR PRODUCING A DRIP-IRRIGATION EMITTER

This application is a continuation of application Ser. No. 07/423,584, filed Oct. 17, 1989, now abandoned, which is a continuation of application Ser. No. 07/172,257 filed Mar. 23, 1988, now abandoned.

The present invention relates to a method for manufacturing a drip-irrigation emitter, to an injection mold for producing fully assembled multi-part drip-irrigation emitters, as well as to a drip-irrigation emitter.

A great many types of such emitters are known, all of which consist of several separately produced components that, in a separate production stage, have to be assembled to form the finished emitter. As such emitters are manufactured in their millions, manual assembly is out of the question for economical reasons, and automated assembly machinery has to be used. This machinery is very complex and expensive, because while the ready-molded components are poured into the hoppers of the assembly machinery in a totally random orientation, they must arrive at the actual assembly location precisely oriented with respect to, sometimes, several axes.

It is one of the objects of the present invention to overcome these difficulties and to provide a method for manufacturing drip-irrigation emitters which dispenses with a separate assembly stage and according to which the emitters are ejected from the injection mold in the fully assembled state, ready for use.

This the invention achieves by providing a method for manufacturing a drip irrigation emitter, comprising the steps of:

molding onto an injection-mold core having at least n different active diameters, n different, axially spaced apart members of said emitter, at least n−1 of said members being substantially annular, the inside diameter of at least one of said annular members being a tight fit on the outside diameter of the next smaller of said members;

stripping said members off said core, starting from the member having the largest inside diameter, thereby causing said members to be tightly nested one inside the other, in a predetermined axial and angular relationship, and ejecting the thus fully assembled emitter from said mold.

The invention further provides an injection mold for producing fully assembled multi-part drip-irrigation emitters, comprising:

a base plate attachable to the moving platen of an injection molding machine;

a main core attached to, and movable together with, said base plate, and comprising at least two active portions having different diameters, the free active end portion of said main core having the smallest diameter;

a pair of sliding, split-cavity blocks having at least two separate, axially spaced apart cavities adapted to cooperate with said active portions of said core, each of said cavities, in the closed state of said sliding blocks, substantially constituting, in conjunction with one of said active portions, the hollow negative of one of the separate members of said emitters, to be filled during the injection stage of said machine, and a stripper plate actuatable by the ejector bar of said injection molding machine and, when actuated, moving relative to said main core, thereby stripping said separate members off said main core, starting from the member having the largest inside diameter, causing said members to be tightly nested one inside the other.

The invention also provides a drip-irrigation emitter, comprising:

an inner member provided with an inlet member introducible into a supply line through a hole in the wall thereof and leading into a system of grooves extending around and along at least a position of the outside surface of said inner member;

at least one substantially annular member tightly mountable on the outside surface of said inner member, the inside wall of which annular member forms in conjunction with said system of grooves a flow-attenuating duct leading towards an outlet member, wherein both said inlet member and said outlet member are integral parts of said inner member.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 7 is a view, in cross section along plane A—A of FIG. 8, of the assembled emitter according to the invention;

FIG. 8 is a top view of the emitter of FIG. 7;

FIG. 9 is an exploded view, in partial cross section, of the emitter according to the invention, as seen in direction of arrow C in FIG. 8, and FIG. 10 shows a view, in cross section along plane B—B of FIG. 8, of the innermost member of the emitter of FIG. 7.

Figure 1:
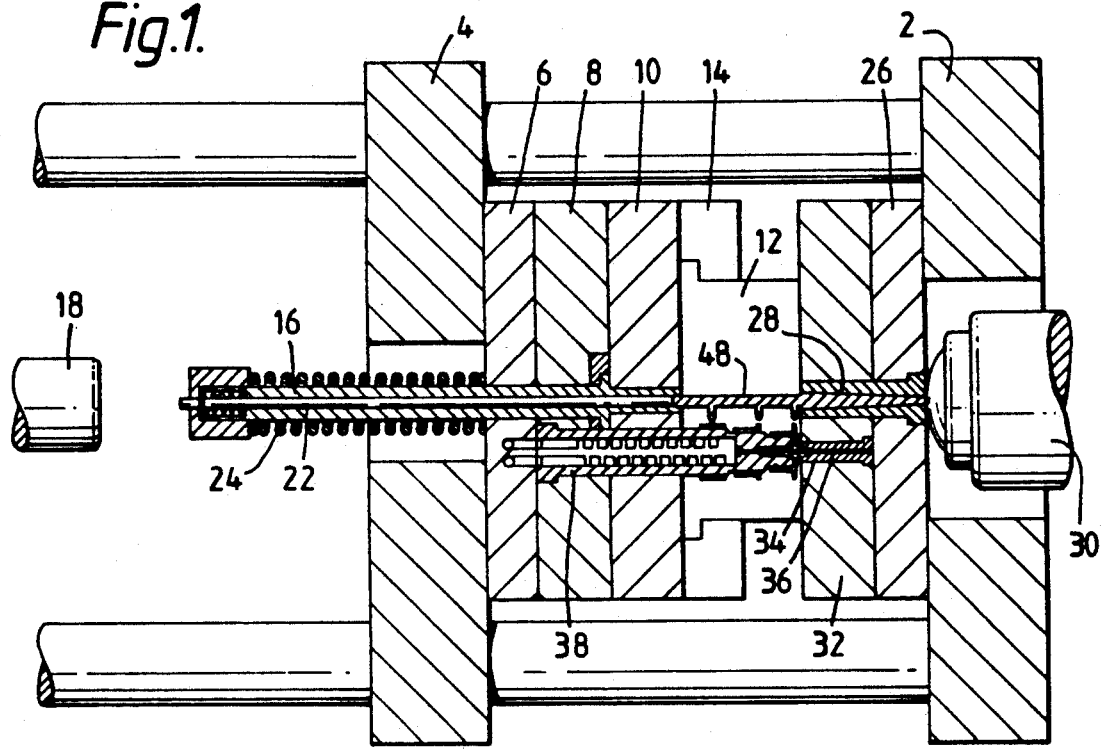
FIG. 1 is a cross-sectional, schematic view of the injection-molding device according to the invention immediately after injection has taken place.

Referring now to the drawings, there is seen in FIG. 1, mounted between the stationary platen 2 and the moving platen 4 of an injection molder (not shown), the device according to the invention. The device is seen to comprise a base plate 6 and a core-retaining plate 8, both fixedly attached to the moving platen 4. A third plate 10, movable in the axial direction, serves both as stripper plate as will be seen further below, and as base plate for the sliding split-cavity blocks 12 and their guide rails 14. The slide-operating pins are not shown.

The stripper plate 10 is moved by a knockout rod 16 actuated by the ejector bar 18. The knockout rod 16 is fixedly attached to the stripper plate 10 and moves freely in the bore passing through plates 6 and 8. The stripper-plate end of the knockout rod 16 is shaped to constitute a sprue lock 20 seen to better advantage in FIG. 4. Inside the rod 16 is movably mounted the sprue knockout pin 22, actuated by the ejector bar. A helical spring 24 pulls the stripper plate against the core-retaining plate 8.

Further seen is a head plate 26, fixedly attached to the stationary platen 2, in which is mounted a sprue bushing 28 against which is pressed the injection nozzle 30 during injection. A second core-retaining plate, 32, is also attached to the platen 2. The end of the bushing 34 which retains the needle-like core 36 serves also as cavity 37 for the barbed portion of the inlet member 64 of the emitter (see FIG. 7).

Figure 4:
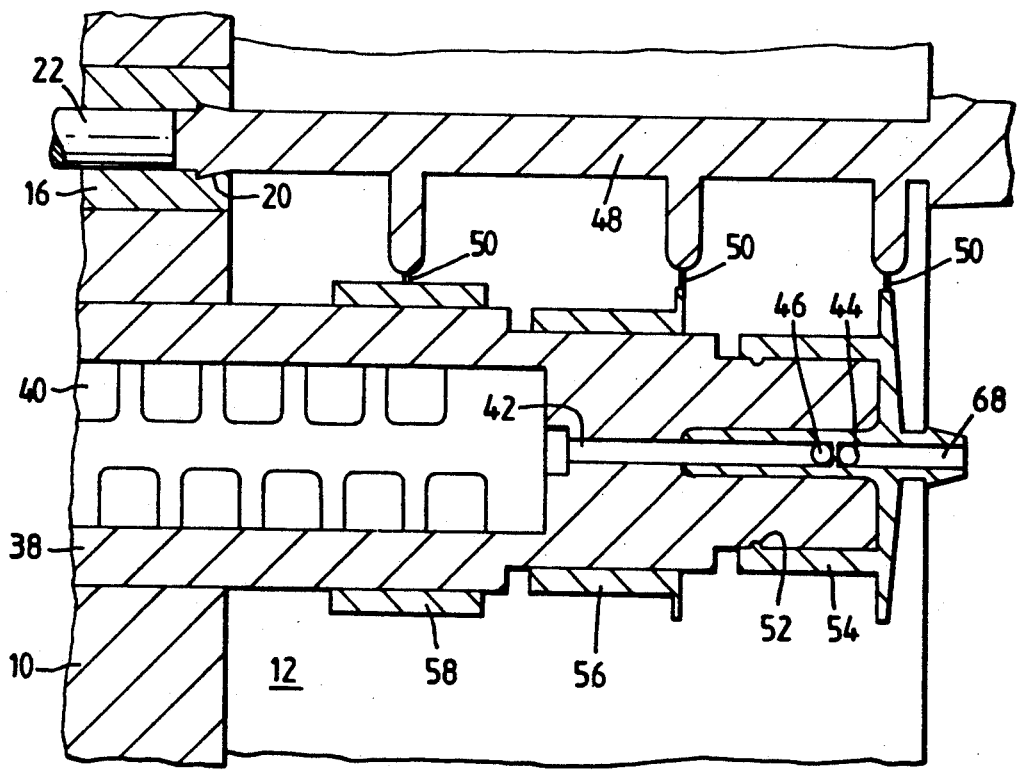
FIG. 4 is an enlarged detail of FIG. 1, showing the molded components at the stage represented in FIG. 2.

The main core 38, retained, as already stated, in plate 8, accommodates in its hollow interior a cooling duct 40 communicating as can be seen, with coolant-supply holes in the base plate 6. The active portion of the core 38, shown to better advantage in FIG. 4, is seen to be stepped, each step serving as core to members of the final product, which members, in a schematic representation, are shown as injected, being the inner member 54 of the emitter, the first annular member 56 and the second annular member 58 (see also FIG. 6).

The precise shape and function of these members will be discussed further below.

Figure 6:
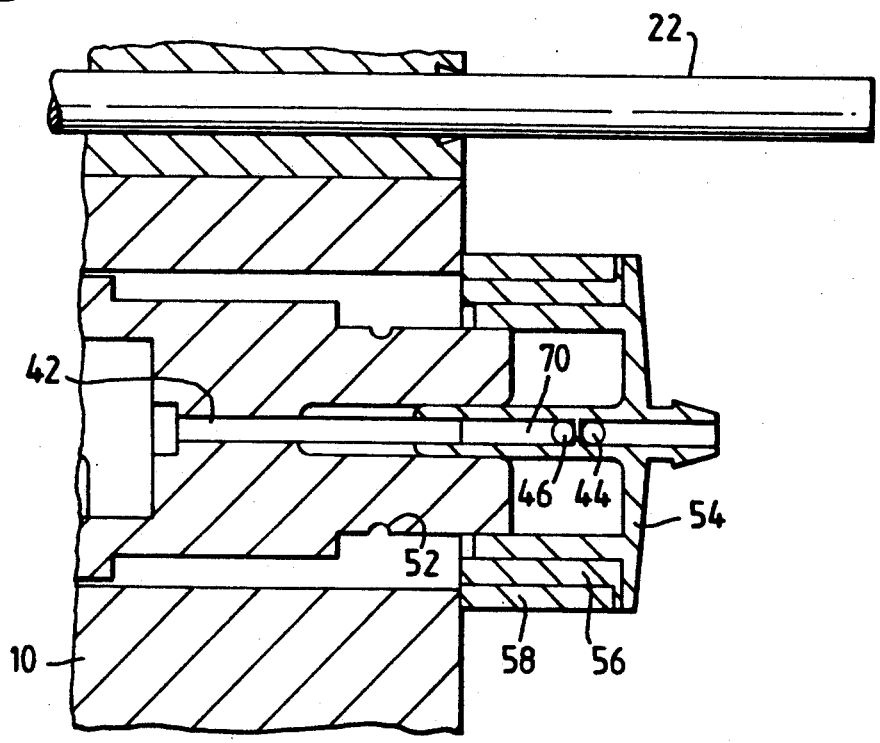
FIG. 6 illustrates the final stage of stripping and assembly.

Since the three above-mentioned members are eventually going to be assembled by being nested one inside the other as clearly seen in FIG. 6, it is obvious that the relative diameters of the core steps will be such that the inside diameter of each emitter member (as determined by the diameter of the respective core step) will equal the outside diameter (as determined by the cavity) of the next smaller member.

Further seen is a needle-like core 42, mounted inside the main core 38 which produces the outlet bore 70 of the inner emitter member 54. The two small circles near the end of the core 42 signify two side cores 44 and 46, attached to the sliding cavity block 12 (FIG. 4), which produce the horizontal bores 78 and 80 respectively (FIG. 10). The cavities in the split-cavity blocks 12 obviously contain the features, in negative, of the meandering flow-attenuating groove systems 76 and 84, as seen in FIG. 9.

Also better visible in FIG. 4 are the sprue 48 and in its runners and the gates 50 as well as an undercut 52 in the end portion of the core 38, producing an inside ridge in member 54.

Figure 2:
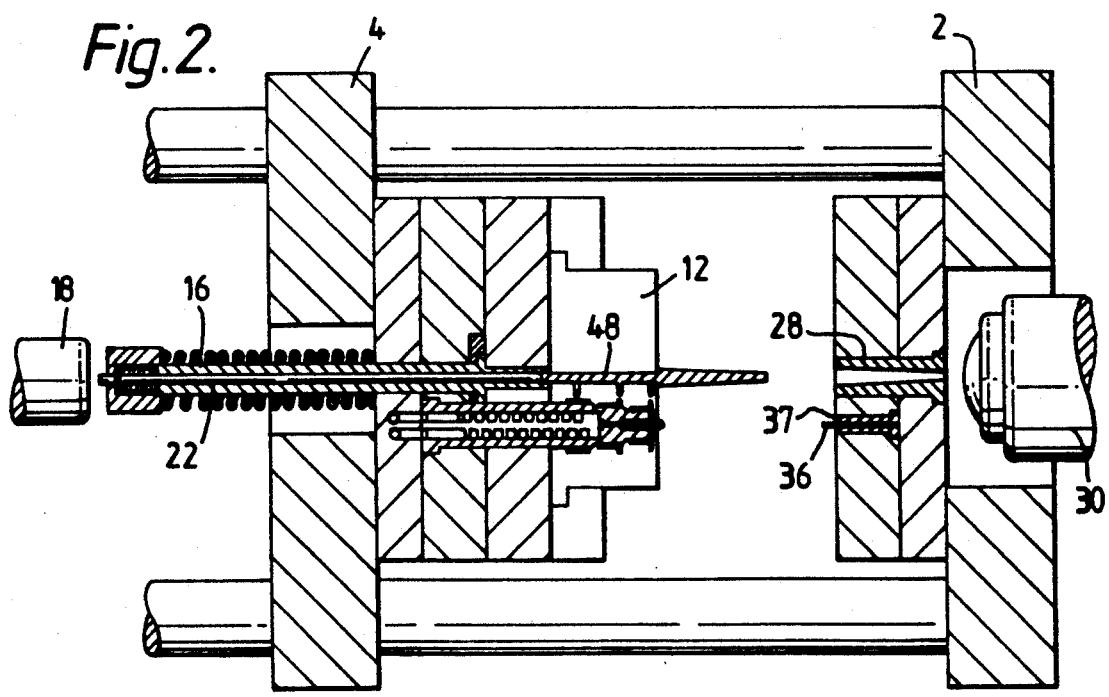
FIG. 2 shows the device in the first stage of opening after injection.

In FIG. 2, the moving platen 4 has been moved to the left and the mold has opened. Due to the provision of the sprue lock 20 (FIG. 4), the sprue 48 has been "pulled", i.e., torn off the nozzle 30 and extracted from the sprue bushing 28, but the ejector bar 18 has not yet been moved out to operate the knockout rod 16 and pin 22. However, the movement of the platen 4 has caused the slide mechanism (not shown) to open the split-cavity blocks 12.

Figure 3:
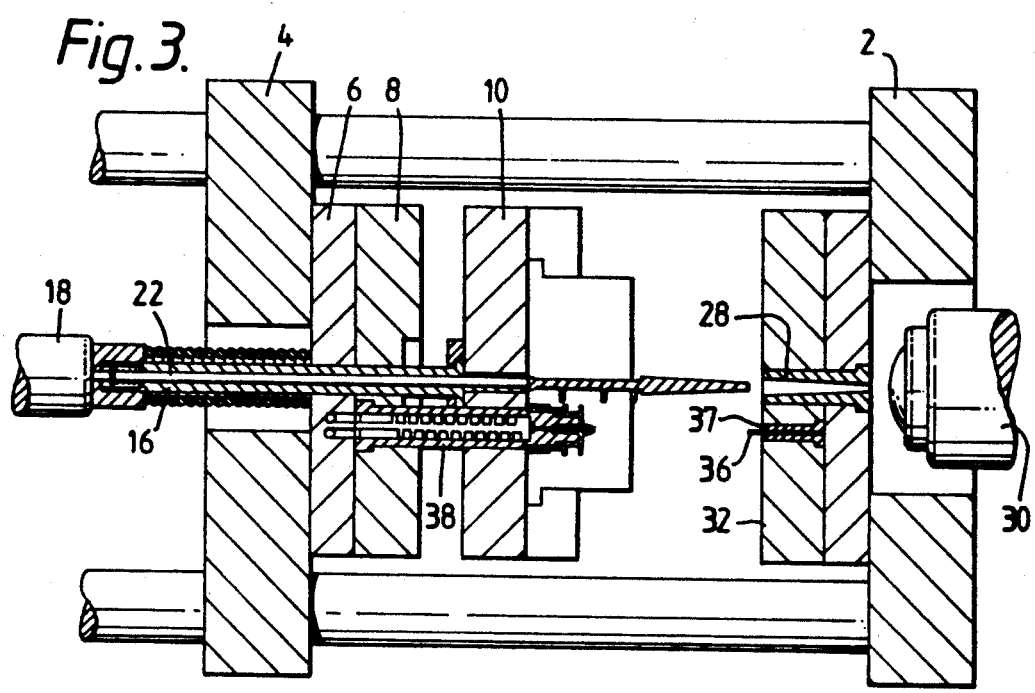
FIG. 3 represents the second stage of opening, in which stripping for assembly has commenced.

In FIG. 3 (and the enlarged detail in FIG. 5) the ejector bar 18 has started to push the knockout rod 16 and the knockout pin 22. As a consequence, the stripper plate 10 has been lifted off plate 8, while the main core 38, being held down by plate 8, does not participate in this movement which, therefore causes the emitter members 58, 56 and 54 to be progressively stripped off the core steps on which they are seated, producing the telescoping effect shown initiated in FIGS. 3 and 5, and completed in FIG. 6. The role of the ridge inside the inner member 54 produced by the undercut 52 now becomes clear: the inner member 54 must be retained on its step of the core 38 until the other two members 58 and 56 are fully pushed onto the inner member 54. A further relative motion between the main core 38 and the stripper plate 10 will crush the ridge produced by the undercut 52 and permit the now fully assembled emitter to drop off the mold, to be collected in a container.

Figure 5:
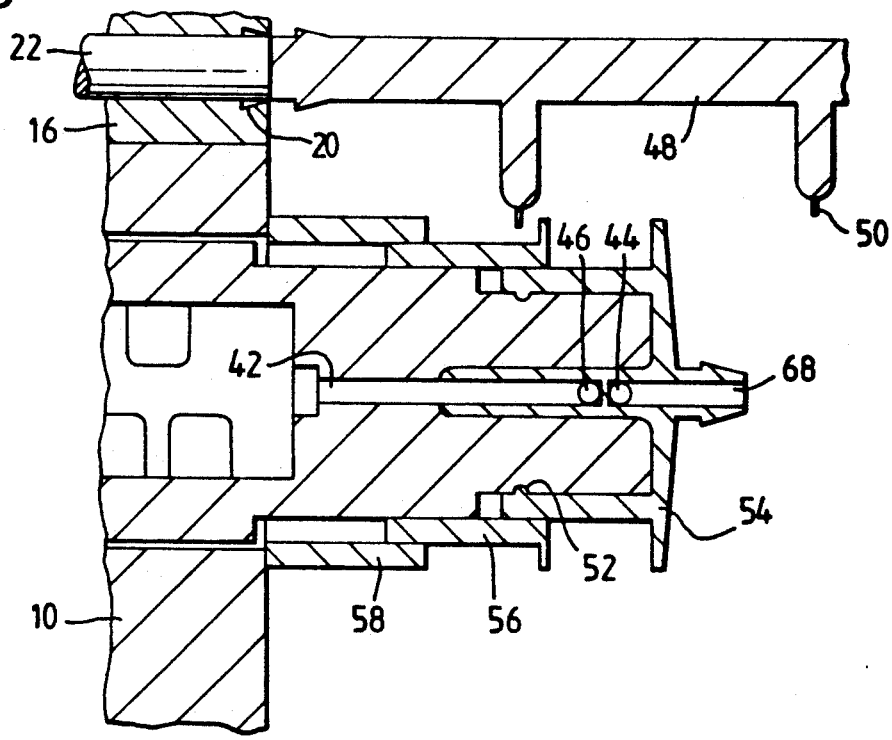
FIG. 5 is an enlarged detail of FIG. 3, in which stripping has progressed.

It is also seen that somewhere between the stages depicted in FIGS. 5 and 6, the sprue 48 has been ejected by the knockout pin 22.

The emitter according to the invention is represented in FIGS. 7 to 10, There are seen in FIG. 7 three concentrically nested members, an inner member 54, a first annular member 56 and a second annular member 58, member 54 tightly fitted into member 56, and member 56 tightly fitted into member 58.

The inner member 54 is closed on top and has a flange-like rim 60 as well as reinforcing ribs 62. Integral with the inner member 54, there are provided a tubular inlet member 64 and a tubular outlet member 66. The bores 68 and 70 of these members are not, however, in direct communication, being separated by a thin wall section 72. The "barbed" tip of the inlet member 64 is relatively easily pushed into a hole punched or drilled into the supply line, yet once inserted, offers great resistance to forces trying to pull it out again. Inside the inner member 54 there are provided a number of ribs 74 which serve as braces.

On the cylindrical outside wall of the inner member 54 there are provided, in this embodiment of the emitter, three tiers I, II, III of a system of meandering grooves 76 (see FIGS. 9 and 10) which, in conjunction with the annular members 56 and 58, will be seen to constitute the flow attenuating elements of the emitter. As can be seen in FIGS. 9 and 10, one end of groove system 76 of tier I communicates via a horizontal bore 78 with the inlet bore 68, while one end of groove system 76 of tier II communicates via a horizontal bore 80 with the outlet bore 70.

The first annular member 56, shown in FIG. 9, in partial cross section, has a smooth inside wall 82. Its cylindrical outside wall is also provided with three tiers I, II, III of a system of meandering grooves 84. There are further seen two holes which pass through the wall of member 56, a first hole 86 which, in assembly, is located above, and registers with, the other end, 88, of the groove system 76 in tier I of the inner member 54, and a second hole, 90, located in assembly above, and registering with, the end of groove system 76 in tier II. Thus groove system 84, tier I, of member 56 communicates via hole 86 with groove system 76, tier I, of member 54, and groove system 84, tier III, of member 56 communicates via hole 90 with groove system 76, tier III, of member 54.

It is also clear that, in assembly, the inside wall 82 of the first annular member 56 forms in conjunction with the system of grooves 76 of the inner member 54 a system of flow-confining and, because of their geometry, flow-attenuating ducts.

The system of grooves 84 of the first annular member 56 in its turn becomes upon assembly a system of ducts in conjunction with the inside wall 94 of the second annular member 58, a simple, sleeve-like element.

While the 2×3 tier emitter shown constitutes an optimum configuration for typical low outputs, higher outputs are obtainable by, e.g., a 2×2 tier configuration, in which the length of the flow-attenuating path is reduced by about a third. In principle, it would also be possible to use a 1×n tier configuration, that is, an appropriately modified inner member 54 and the second annular member 58, without the first annular member 56.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for manufacturing a drip irrigation emitter using an injection mold including a stationary and a movable platen, a sprue bushing, a plurality of sprue gates, and a stripper plate, said method comprising the steps of:
    a) molding onto a main injection-mold core having three different active diameters, three different, axially spaced apart members of said emitter, at least two of said members being substantially annular, the inside diameter of at least one of said annular members being a tight fit on the outside diameter of the next smaller of said members;
    b) retracting the movable platen of said mold thereby extracting the sprue from said sprue bushing;
    c) removing a first, axial, needle-shaped, core from the smallest of said emitter members and opening a split cavity that determines the outside configuration of said emitter members thereby also withdrawing second and third, lateral, needle-shaped cores;
    d) advancing the stripper plate of said mold thereby stripping the largest of said emitter members from that portion of said main injection-mold core that has the largest of said active diameters, and subsequently initiating a process of mutually telescoping said emitter members while temporarily retaining said smallest member against movement in response to the advance of the stripper plate whereby, in the course of said process, said sprue gates are severed from said members in an axial direction and at the end of said process, said members have been assembled into an emitter wherein said members are tightly nested one inside the other and frictionally held in a predetermined axial and angular relationship that establishes an uninterrupted flow path for proper functioning of said emitter; and
    e) ejecting said emitter from said mold.

2. A method for manufacturing a drip irrigation emitter comprising the steps of:
    a) providing a cylindrical injection-mold core having three active axially displaced cylindrical portions whose diameters decrease uniformly in one axial direction;
    b) molding a cylindrical emitter member onto the surface of each of said three portions of said core, the outside surface of a succeeding smaller member having continuous, meandering grooves of a generally circumferential direction and having a diameter that would establish an interference fit with the inside diameter of the preceding larger member;
    c) imparting movement to a stripper plate in said one axial direction while simultaneously blocking movement of the smallest diameter member such that, initially, the largest diameter member is stripped from said core, continuing movement of said stripper plate in said one axial direction causing each succeeding smaller diameter member to be stripped from said core and to telescopically slide into a nesting relationship inside the preceding larger diameter member so that the emitter members are frictionally held in a predetermined axial and angular relationship in which said grooves form an uninterrupted flow path.

3. A method for manufacturing components having an interference fit and assembling them comprising the steps of:
    a) providing a cylindrical injection-mold core having a plurality of axially displaced cylindrical portions whose diameters decrease uniformly in one axial direction thereby defining a largest diameter portion, and a smallest diameter portion;
    b) providing a shallow circumferential groove in the smallest diameter portion;
    c) molding a cylindrical member onto the surface of each of said portions of said core, the inner surface of the member molded on the smallest diameter portion having a ridge that mates with said groove, the diameters of the members and of the portions of the core being such that an interference fit is established between the members when they are nested;
    d) effecting relative axial displacement of said core in a direction opposite to said one axial direction while blocking displacement of the largest member such that,
        during initial relative displacement of said core, the largest member is stripped from the core by reason of the blocking of the largest member, and
        during final relative displacement of the core, said groove in the smallest portion, in cooperation with the ridge on the inner surface of the smallest member, retains the smallest member to the core until all of the members are fully nested, after which further displacement of the core causes the ridge to be withdrawn from the groove as the smallest member is stripped from the core thereby completing assembly of the members.

* * * * *